UNITED STATES PATENT OFFICE.

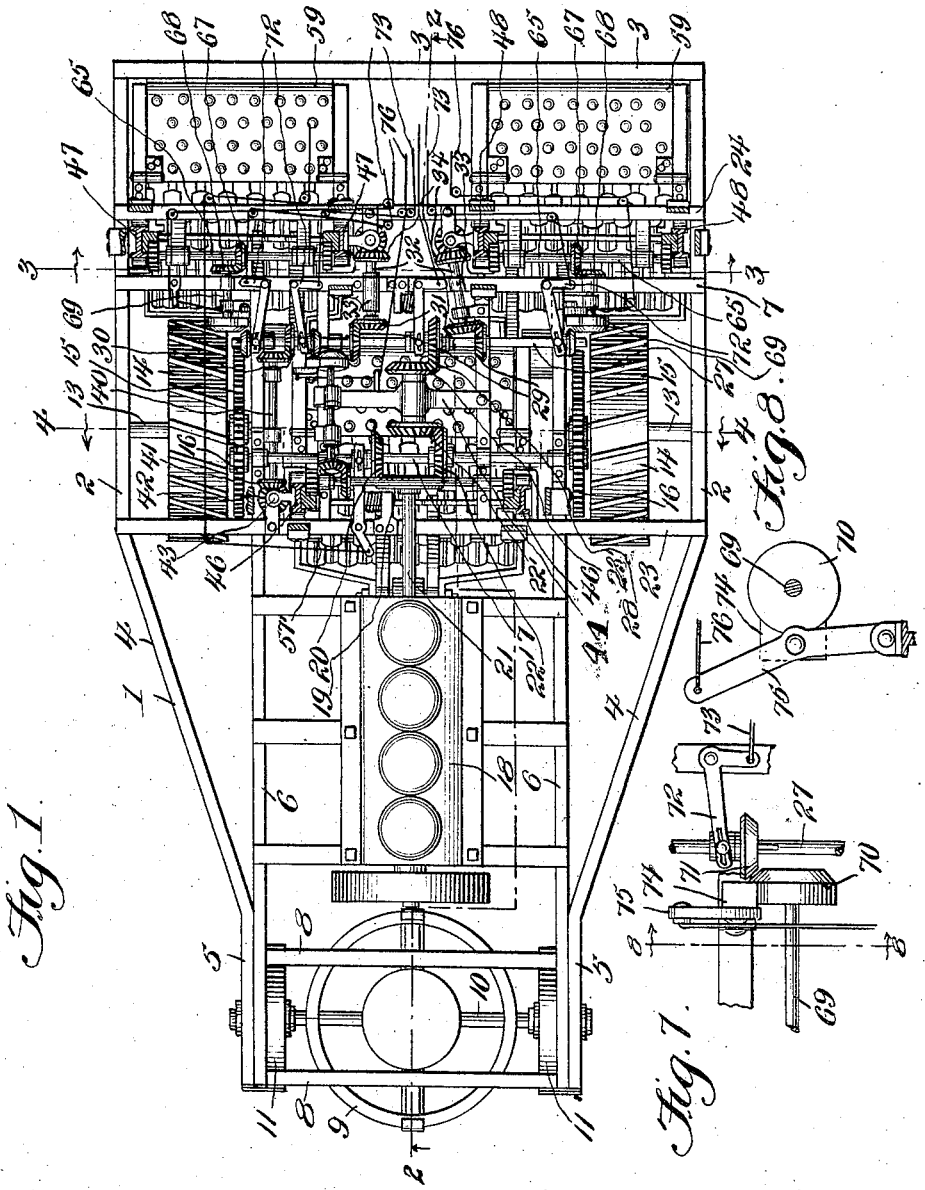

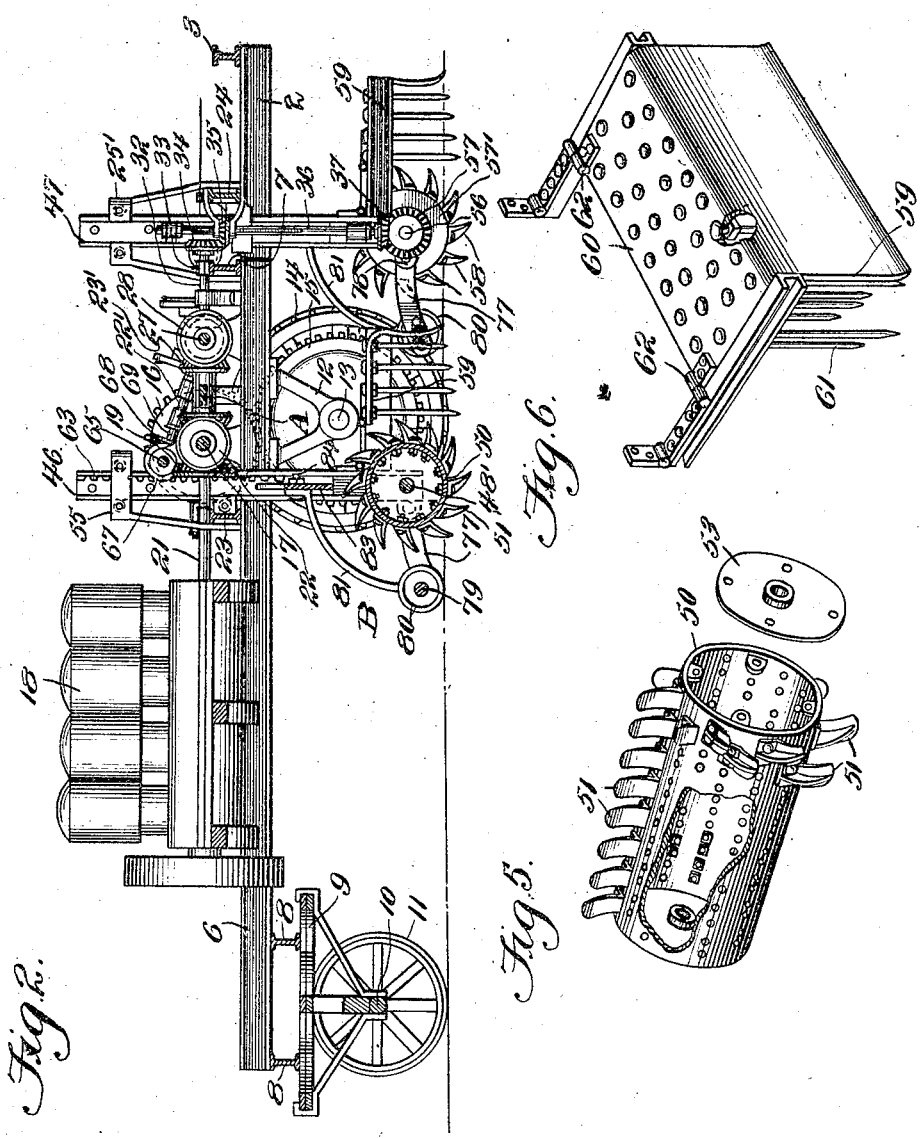

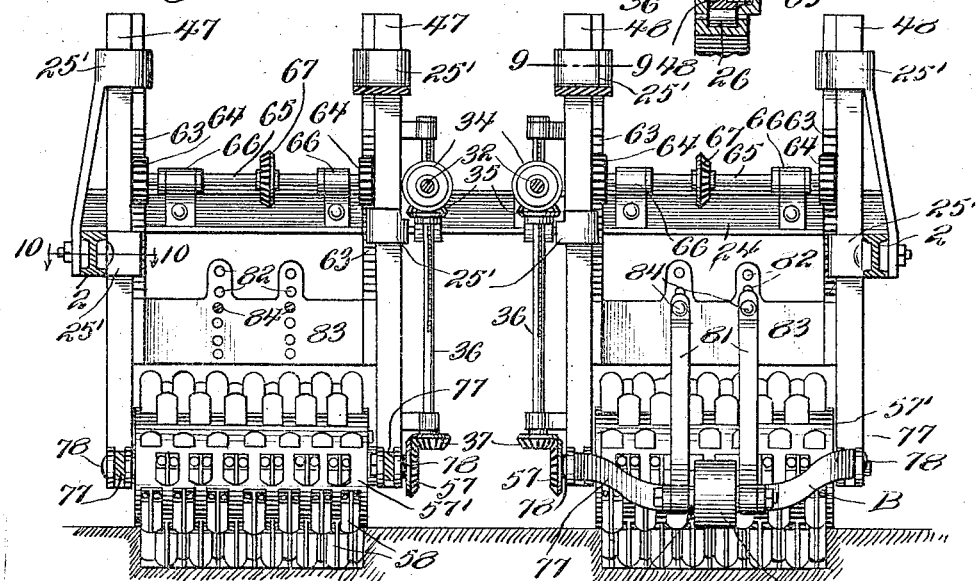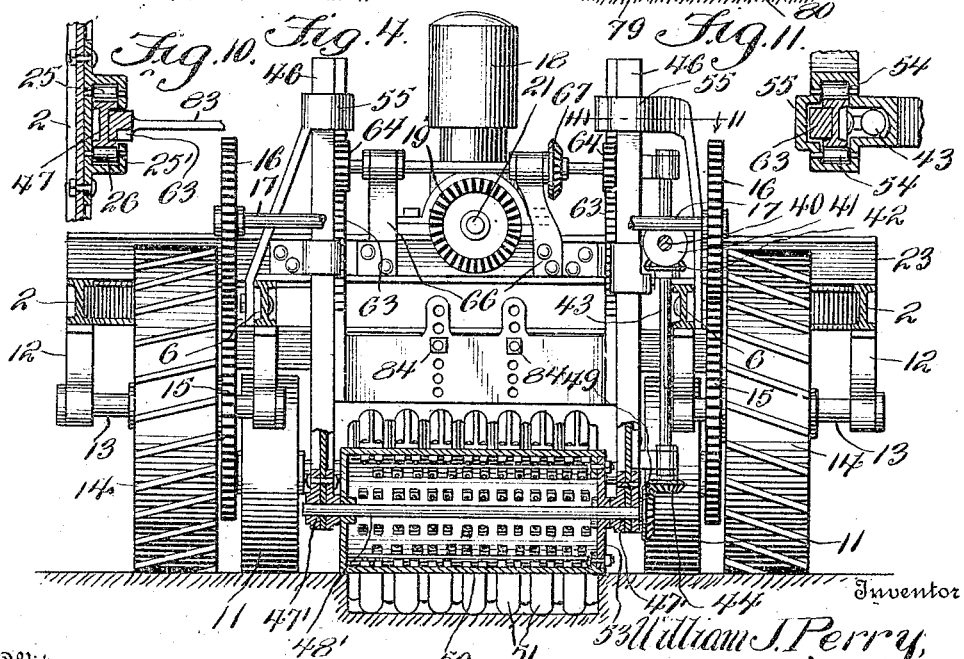

WILLIAM JEROME PERRY, OF CASTLEGAR, BRITISH COLUMBIA, CANADA, ASSIGNOR OF ONE-FOURTH TO WILLIAM SCHEFFER, OF CASTLEGAR, BRITISH COLUMBIA, CANADA.

CULTIVATOR.

1,054,609.  Specification of Letters Patent.  Patented Feb. 25, 1913.

Application filed December 13, 1911. Serial No. 665,580.

*To all whom it may concern:*

Be it known that I, WILLIAM J. PERRY, a citizen of the United States of America, late of Wisconsin, United States of America, now residing at Castlegar, British Columbia, Dominion of Canada, have invented new and useful Improvements in Cultivators, of which the following is a specification.

The invention relates to cultivating machines of the rotary type, and more particularly to those driven by an explosive engine.

One object of the present invention is to provide a cultivating machine, whereby the rotary cylinders or plows will be at all times under the control of the operator so that the same may be raised or lowered to regulate the plowing action.

Another object of the present invention is to provide a machine of this character, in which the dirt will be separated in the course of the plowing operation and subsequent to the action of the plows; the separator at the same time operating as a harrow whereby the ground may be leveled immediately succeeding the plowing operation.

A further object of this invention is the provision of a cultivating machine of this class whereby the plows may be regulated to enter the ground at any depth, the machine for this purpose embodying manually operable means adjustable relatively to the plows and arranged adjacent thereto to travel over the surface of the ground in the plowing action.

To these ends the invention comprehends a cultivator comprising a supporting frame upon which is mounted a rotary plow and a combined separator and harrow, the plow and separator being mounted for vertical movement relative to the supporting frame whereby the cultivating action of the machine may be regulated in the movement thereof.

With the above and other objects in view, which shall appear as the description progresses, the invention consists in the construction, combination, and arrangement of parts hereinafter set forth, and falling within the scope of the appended claim.

In the drawings:—Figure 1 is a top plan view of a machine constructed in accordance with the present invention. Fig. 2 is a longitudinal section on the line 2—2 of Fig. 1. Fig. 3 is a section on line 3—3 of Fig. 1. Fig. 4 is a transverse section on the line 4—4 of Fig. 1. Fig. 5 is a perspective view of one of the cylinders, parts being broken away. Fig. 6 is a perspective view of the combined separator and harrow. Fig. 7 is a detail view of the clutch and brake mechanism for raising the plows. Fig. 8 is a section on the line 8—8 of Fig. 7. Fig. 9 is a section on the line 9—9 of Fig. 3. Fig. 10 is a section on the line 10—10 of Fig. 3, and Fig. 11 is a section on the line 11—11 of Fig. 4.

Referring more particularly to the accompanying drawings, wherein is illustrated the preferred form of the invention, and in which like numerals of reference designate similar parts throughout the several views, the numeral 1 designates the supporting frame comprising the side bars 2, and the rear bar 3, the latter interconnecting the bars 2. The side bars 2 are bent angularly and toward each other as shown at 4, and terminate at their forward ends in relatively straight portions 5 arranged parallel to, and in advance of the bars 2. The portions 5 are bolted or otherwise secured to one end of longitudinally extending bars 6, the opposite ends of which latter are secured to a transverse brace bar 7 arranged in advance of the rear bar 3 and securely fastened to the side bars 2 of the supporting frame. These several bars forming the supporting frame are preferably of I section, as shown. The forward ends of the bars 2 and 6 are interconnected by means of transverse I-beams 8 which latter are supported beneath the frame and are of a length equal to the width of the frame at its forward end. Secured to the beams 8 is a fifth wheel 9, which latter is connected to the front axle 10 upon which is journaled the ground wheels 11. The bars 2 and 6, rearwardly of the angular portions 4 are provided with depending hangers 12 of the traction wheels 14. The inner ends of the axles 14 are provided with gears 15 meshing with gears 16 secured to the opposite ends of a power shaft 17, which latter is driven from the engine 18 through the medium of the miter gears 19 and 20. The gear 20 is, preferably, mounted upon the shaft 17 for sliding movement so that the same may be disengaged from the gear 19 upon the engine crank shaft 21 whereby the machine may be brought to a stop independently of the operation of the engine.

Loosely mounted on the shaft 17 adjacent the gear 20 and in engagement with the gear 19 is a power transmitting gear 22 meshing with a similar gear 22' carried by one end of a stub shaft journaled in a suitable bearing A upon the main frame, the free end of the stub shaft having keyed thereto a beveled gear 23' the purpose of which will appear later.

Arranged across the frame 1 are reinforcing bars 23 and 24, the latter being adjacent the bar 7. The numeral 27 designates a plow driving shaft which is arranged rearwardly of the power shaft 17 and is provided with a power receiving gear 28 designed to mesh with the gear 23' keyed to the free extremity of the stub shaft within the bearing A. The gear 28 is mounted for sliding movement on the shaft 27 so that the same may be moved into and out of engagement with the gear 23' in the movement of the machine. Keyed to the shaft 27 are a plurality of miter gears 29 and 30. The gears 29 are in operative engagement with correspondingly formed gears 31 which latter are mounted upon one end of horizontal shafts 32 journaled in suitable bearings 33 carried by the bar 7. At their opposite ends the shafts 32 are provided with beveled gears 34 meshing with similar gears 35, splined on vertically arranged shafts 36, which latter have keyed to their lower ends miter gears 37. The beveled gear 30 keyed to the shaft 29 meshes with a similar gear upon one end of a shaft 40, which latter is provided at its opposite end with a miter gear 41 in mesh with a gear 42 splined on a vertically arranged shaft 43. At its lower end the shaft 43 is provided with a miter gear 44.

Slidably mounted in the supporting frame 1 are plow carrying frames each comprising vertically arranged bars 46, 47, and 48. The bars 46 are mounted adjacent the vertical shaft 43 and at their lower ends are provided with alining openings 47, in which is journaled a shaft 48' provided upon one end with a beveled gear 49 meshing with the gear 44 keyed to the lower end of the shaft 43. Keyed to the shaft 48 for rotary movement therewith is a cylinder 50. Arranged upon the circumference of the cylinder 50 and projecting radially therefrom are a plurality of spades or plow elements 51, which latter are bolted to the cylinder 50, the cylinder for this purpose being provided with bolt-receiving openings and having one of its ends closed by a removable cover 53, whereby access may be had to the interior of the cylinder for the purpose of attaching and detaching the elements 51. These bars 46, as well as the bars 47 and 48, are slidable vertically relatively to the frame 1, as before stated, the bars 46 riding between rollers 54 carried by standards 55 supported upon the longitudinally extending bars 6, and the bars 47 and 48 riding upon rollers 25 and 26 (Fig. 10) respectively in the brackets 25' mounted upon the supporting frame. The lower ends of the bars 47 and 48 are formed with alining openings in which are journaled shafts 56, the confronting ends of the said shafts 56 being provided with beveled gears 57 meshing with the corresponding gears 37 carried by the shafts 36. Each of the shafts 56 has keyed thereto a drum 57, provided upon its periphery with radially extending spades or plow elements 58. As these drums are identical in construction to the drum 50 hereinbefore described a further explanation of the same is deemed unnecessary.

Pivotally secured to each pair of the bars 46, 47, and 48 of the sliding frame, is a separator 59. These separators are identically constructed, and each comprises a supporting plate 60, depending from which are a plurality of separator bars 61, which latter may be either curved or straight as desired, and are preferably arranged in stepped relation as shown. The supporting plates 60 are pivotally secured to their respective supporting bars by means of hinges 62, or other suitable pivotal connections, and are arranged in the rear of the revolving cylinders 50 and 57 respectively so that the dirt thrown up by the plowing elements carried by the said cylinders may be broken up and separated, previous to its falling back upon the ground, the bars 61 simultaneously agitating the soil so that the same may be level or uniform after the passage of the machine.

To shift the plow carrying frames, the bars 46, 47 and 48 of each frame are provided with racks 63 designed to operatively engage pinions 64 fixed to the opposite ends of shafts 65 journaled in bearings 66 on the main frame of the machine. The operating shafts 65 of the plow carrying frames have keyed thereto miter gears 67 designed to mesh with similar gears 68 fixed to the ends of transmission shafts 69 journaled in bearings upon the main frame 1 and preferably extending at right angles to the shafts 65. Each of the transmission shafts 69 has keyed to its free end a beveled friction disk 70 adapted to be engaged by a similar disk 71 slidably mounted upon the plow driving shaft 27, the disk 71 being slidable longitudinally of the shaft 27 through the medium of an operating lever 72 pivoted upon the transverse brace bar 7 of the main frame 1 and operable under the action of cables 73 connected to operating levers (not shown) mounted upon the machine frame. The disk 71 and the levers 72 are preferably interconnected through the medium of a pin and slot connection so as to permit of the sliding of the disks in the movement of the levers. By virtue of this construction it will be seen that the plows and their respective elevating mechanisms are driven by a single shaft, the plows being operable independently of the elevating mechanism and rendered operative and inoperative thereby.

For the purpose of retaining the plows in their elevated positions, a brake mechanism is provided and as shown consists of a brake shoe 74 fixed to a pivoted lever 75 mounted upon the main frame of the machine and adjacent each friction disk 70, the brake shoe being operable to engage the disks 70 in the elevated positions of the plows and actuated by a cable 76 connected to the free end of a lever 75 and secured at its free end to an operating lever (not shown) upon the machine frame.

For the purpose of regulating the depth of the plows in entering the ground, each plow is equipped with an adjusting mechanism B. This adjusting mechanism comprises a yoke 77 pivoted at each end to the lower extremities of the lifting bars of the plows as shown at 78 and formed centrally to provide an axle 79 upon which is mounted a roller 80. Pivoted to the yoke 77 upon opposite sides of the roller 80 are adjusting arms 81 apertured at their free ends to coöperate with one of a plurality of openings 82 formed vertically of a plate 83 fixed to the lower ends of the racks 63 whereby the apertures in the arms 81 may be brought into alinement with one of the apertures in the plates to lower or elevate the roller 80 to regulate the depth of the plows in the plowing operation, the arms being held in their adjusted position by means of bolts 84 fastened through the apertures.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described my invention what I claim and desire to secure by Letters-Patent is:

A cultivator comprising a supporting frame, a plow carrying frame slidably disposed in said supporting frame, said plow carrying frame consisting of a pair of vertical bars spaced apart, guides on said supporting frame for the bars, a plow on said plow carrying frame, means associated with said plow and adjustable relatively thereto to vary the depth that the plow enters the ground, said means comprising a yoke pivoted to the bars of the supporting frame in proximity to the plow, a roller on said yoke, a plate interposed between the bars of the supporting frame above the plow and connected to such bars and formed with a plurality of openings, and adjusting arms pivoted to said yoke upon the opposite sides of the roller and having their free ends apertured to register with the apertures in the plate, and bolts passed through said apertures to hold the yoke and roller in the desired position.

In testimony whereof I affix my signature in presence of two witnesses.

WILLIAM JEROME PERRY.

Witnesses:
  A. B. FLECEUR,
  D. P. KANE.